United States Patent
Berggreen (10) Patent No.: US 7,170,900 B2
(45) Date of Patent: Jan. 30, 2007

(54) METHOD AND APPARATUS FOR SCHEDULING MESSAGE PROCESSING

(75) Inventor: Arthur Berggreen, Santa Barbara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1076 days.

(21) Appl. No.: 09/905,391

(22) Filed: Jul. 13, 2001

(65) Prior Publication Data
US 2003/0016685 A1    Jan. 23, 2003

(51) Int. Cl.
*H04L 12/28* (2006.01)
*H04L 12/54* (2006.01)

(52) U.S. Cl. .................. 370/412; 370/419; 370/389; 370/429

(58) Field of Classification Search ........... 370/412, 370/468, 395.4, 395.41, 395.42, 395.43, 370/514, 229, 230
See application file for complete search history.

(56) References Cited

U.S. PATENT DOCUMENTS

| | | | | |
|---|---|---|---|---|
| 4,979,165 A | * | 12/1990 | Dighe et al. ............... 370/416 |
| 5,268,900 A | | 12/1993 | Hluchyj et al. ............ 370/94.1 |
| 5,446,738 A | * | 8/1995 | Kim et al. ............. 370/395.42 |
| 5,602,830 A | | 2/1997 | Fichou et al. .............. 370/232 |
| 5,724,358 A | | 3/1998 | Headrick et al. .......... 370/418 |
| 5,953,336 A | | 9/1999 | Moore et al. .............. 370/395 |
| 6,408,006 B1 | * | 6/2002 | Wolff ....................... 370/412 |
| 6,477,144 B1 | * | 11/2002 | Morris et al. ............ 370/230.1 |
| 6,501,733 B1 | * | 12/2002 | Falco et al. ................. 370/235 |
| 6,570,883 B1 | * | 5/2003 | Wong ........................ 370/412 |
| 6,577,596 B1 | * | 6/2003 | Olsson et al. .............. 370/230 |
| 6,680,906 B1 | * | 1/2004 | Nguyen ..................... 370/229 |
| 6,728,270 B1 | * | 4/2004 | Meggers et al. ............ 370/514 |

OTHER PUBLICATIONS

Pancha P et al: "Guaranteeing bandwidth and minimizing delay in packet-switched (ATM) networks" Global Telecommunications Conference, 1995. Conference Record. Communication Theory Mini-Conference, Globecom '95., IEEE Singapore Nov. 13-17, 1995, New York, NY, USA,IEEE, US, Nov. 13, 1995, pp. 1064-1070, XP010164535 ISBN: 0-7803-2509-5 p. 1067, col. 1, line 7—col. 2, line 12 and figure 4.

(Continued)

*Primary Examiner*—Hanh Nguyen (57) ABSTRACT

The present invention provides a method and apparatus for scheduling message processing. The present invention provides a scheduling mechanism, or scheduler (602), that receives messages (608) and stores the messages (610 or 614) in a first queue (604) or a second queue (606) based, in part, on various criteria associated with the messages. The criteria include message attributes, such as message priority, virtual private network ("VPN") classification and destination software function. The first queue (604) can be a first-in-first-out queue, and the second queue (606) can be a multi-dimensional queue. The scheduler (602) then schedules the queued messages (612 or 616) for processing based, in part, on various operating criteria (618), such as historical operating data, current operating data and anti-starvation criteria. In addition, the scheduler (602) can be programmed to function in a variety of operating modes.

51 Claims, 6 Drawing Sheets

OTHER PUBLICATIONS

Morgan S P: "Queueing disciplines and passive congestion control in byte-stream networks" INFOCOM '89. Proceedings of the Eighth Annual Joint Conference of the IEEE Computer and Communications Societies. Technology: Emerging or Converging, IEEE Ottawa, Ont., Canada Apr. 23-27, 1989, Washington, DC, USA, IEEE Comput. Soc.Pr, US, Apr. 23, 1989, pp. 711-720, XP010015428 ISBN: 0-8186-1920-1 p. 711, col. 1, line 15—col. 2, line 5; p. 713, col. 2, line 26—p. 714, col. 1, line 8; p. 714, col. 1, line 28—line 38 and figure 3b.

* cited by examiner

METHOD AND APPARATUS FOR SCHEDULING MESSAGE PROCESSING

FIELD OF THE INVENTION

The present invention relates generally to the field of communications and, more particularly, to a method and apparatus for scheduling messages for processing.

BACKGROUND OF THE INVENTION

The increasing demand for data communications has fostered the development of techniques that provide more cost-effective and efficient means of using communication networks to handle more information and new types of information. One such technique is to segment the information, which may be a voice or data communication, into packets. A packet is typically a group of binary digits, including at least data and control information. Integrated packet networks (typically fast packet networks) are generally used to carry at least two (2) classes of traffic, which may include, for example, continuous bit-rate ("CBR"), speech ("Packet Voice"), data ("Framed Data"), image, and so forth. Packet networks source, sink and/or forward protocol packets.

Congestion and Quality of Service ("QoS") problems inside these networks have not been solved satisfactorily and remain as outstanding issues to be resolved. Although, message scheduling helps alleviate these problems, the efficient scheduling of work with thousands of entities (instances) is not a simple matter. At present, most message scheduling is based on the simplest technique for queuing packets for transmission on an internodal trunk of a fast-packet network: a first-in-first-out ("FIFO") queue. However, FIFO queuing techniques do not address QoS parameters. This technique can also allow overload periods for digitized speech packets and for Framed Data packets, which results in a greater share of bandwidth being provided to one at the expense of the other; an undesirable result.

Another technique, head-of-line-priority ("HOLP"), may give data priority over speech, but does not solve the problem of data and speech queues affecting the QoS of each other and of CBR data fast packets under high traffic conditions. In HOLP, where speech fast packets are given a high priority, speech fast packets may affect the QoS of lower priority queues. Likewise, queuing schemes designed only for data do not solve the problems of integrating other traffic types, such as speech and CBR data.

Most current techniques for scheduling messages depend upon the storage of messages either in FIFO order or priority order. Current messaging queues are not flexible because they do not take into account any current or historical operating conditions. In addition, current functionality is often dependent on a single central processing unit ("CPU") and memory.

Accordingly, there is a need for a method and apparatus for scheduling messages based, in part, on current and historical operating conditions. There is also a need for a method and apparatus that reduces congestion while maintaining QoS for all message types.

SUMMARY OF THE INVENTION

The present invention provides a method and apparatus for scheduling messages based, in part, on current and historical operating conditions. The present invention also provides a method and apparatus that reduces congestion while maintaining QoS for all message types. The present invention is adaptable to accommodate new message types, multimedia applications and multi-service applications. It is flexible, with the ability to cater to a wide range of configurations and environments and improves the QoS of VoIP calls. Moreover, the present invention self-adjusts to traffic/congestion levels through its multiple operating modes. Furthermore, the mode switching points can be adjusted on the fly.

The representative embodiments described herein provide a scheduling mechanism, or scheduler, that receives messages and stores the messages in a first queue and a second queue based, in part, on various criteria associated with the messages. The criteria include message attributes, such as message priority, virtual private network ("VPN") classification and destination software function. The first queue can be a first-in-first-out queue, and the second queue can be a multi-dimensional queue. The scheduler then schedules the queued messages for processing based, in part, on various operating criteria, such as historical operating data, current operating data and anti-starvation criteria. In addition, the scheduler can be programmed to function in a variety of operating modes.

In a first embodiment, the present invention provides an apparatus for scheduling messages that includes two (2) queues and a scheduler communicably coupled to the queues. The scheduler has at least two (2) operating modes. The first operating mode includes receiving messages, storing each message in the first queue based on a first-in-first-out order, and scheduling each queued message from the first queue based on the first-in-first-out order. The second operating mode includes receiving messages, storing each message in the second queue based one or more message attributes, and scheduling each queued message from the second queue based on operating criteria. The scheduler operates in the first operating mode until the number of messages in the first queue exceeds a predetermined value and the second queue is emptied; then it switches modes. The first operating mode may also be triggered by low message traffic conditions. Likewise, the second operating mode may be triggered by high message traffic conditions. Additional queues and operating mode can be added to extend the flexibility of the present invention.

In a second embodiment of the present invention, the scheduler includes a third operating mode. The scheduler switches to the third operating mode when the number of messages in the first queue equals or exceeds a predetermined value. At this point, the scheduler ceases storing messages in the first queue and begins storing messages in the second queue. However, the scheduler continues pulling messages for processing from the first queue until the first queue is empty. Once the first queue is emptied, the scheduler returns to operating in the second operating mode.

Another embodiment of the present invention includes a fourth operating mode in which the scheduler stores messages in the first queue and pulls messages from the second queue. The scheduler switches to the fourth operating mode when the number of messages in the second queue is equal to or less than a predetermined value. The fourth operating mode is maintained until the second queue is emptied. Then the scheduler returns to the first operating mode.

The present invention also provides a method for scheduling one or more messages in which the one or more messages are received, and a first queue is selected for input and output during a first operating mode and a second queue is selected for input and output during a second operating mode. Each message is stored in the first queue based on a first-in-first-out order whenever the first queue is selected for input or in the second queue based on one or more message attributes whenever the second queue is selected for input. Each queued message is scheduled from the first queue based on the first-in-first-out order whenever the first queue is selected for output or from the second queue based one or more operating criteria whenever the second queue is selected for output.

In addition, the present invention provides a communications switch that includes one or more ingress cards, one or more signal processing cards, one or more control cards, one or more egress cards, a switch fabric, a TDM bus, a scheduler, and a first and second queue. Each signal processing card contains an array of digital signal processors and each control card contains one or more processors. The switch fabric communicably couples the ingress cards, the signal processing cards, the control cards and the egress cards together. The TDM bus communicably couple the ingress cards, the signal processing cards, the control cards and the egress cards together. The scheduler communicably is coupled to each processor and has at least a first and second operating mode. The first and second queues are communicably coupled to the scheduler. The first operating mode includes the steps of receiving the one or more messages, storing each message in the first queue based on a first-in-first-out order, and scheduling each queued message from the first queue based on the first-in-first-out order. The second operating mode includes the steps of receiving the one or more messages, storing each message in the second queue based one or more message attributes, and scheduling each queued message from the second queue based one or more operating criteria.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates to communications systems, and more particularly, to processing messages within a communications switch. It will be understood that, although the description herein refers to a communications environment, the concepts of the present invention are applicable to other environments, such as general data processing.

The present invention is adaptable to accommodate new message types, multimedia applications and multi-service applications. It is flexible, with the ability to cater to a wide range of configurations and environments and improves the QoS of VoIP calls. Moreover, the present invention self-adjusts to traffic/congestion levels through its multiple operating modes. Furthermore, the mode switching points can be adjusted on the fly.

The representative embodiments described herein provide a scheduling mechanism, or scheduler, that receives the messages and stores the messages in a first queue and a second queue based, in part, on various criteria associated with the messages. The criteria include message attributes, such as message priority, virtual private network ("VPN") classification and destination software function. The first queue can be a first-in-first-out queue, and the second queue can be a multi-dimensional queue. The scheduler then schedules the queued messages for processing based, in part, on various operating criteria, such as historical operating data, current operating data and anti-starvation criteria. In addition, the scheduler can be programmed to function in a variety of operating modes.

Figure 1:
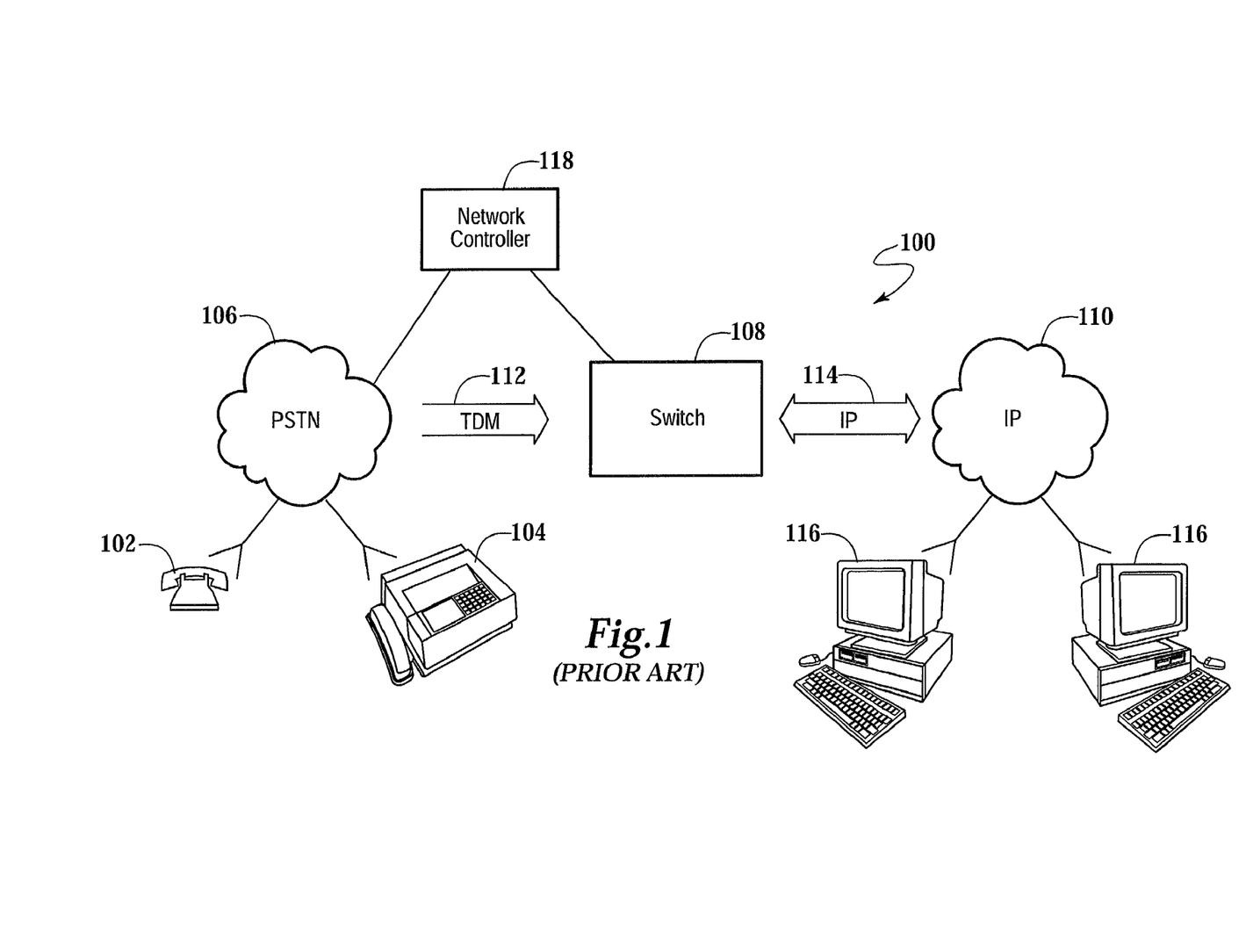
FIG. 1 is a block diagram of a representative integrated network in accordance with the prior art.

Now briefly referring to FIGS. 1–3, a representative network (FIG. 1) and various message scheduling systems (FIGS. 2 and 3) will be described in accordance with the prior art. FIG. 1 depicts a representative integrated network 100 in which phones 102 and faxes 104 are communicably coupled to a public switched telephone network ("PSTN") 106. A switch 108 is communicably coupled to the PSTN 106 and an Internet Protocol ("IP") network 110 to convert time division multiplexing ("TDM") based communications 112 to IP-based communications 114. The switch 108 creates IP packets containing the necessary destination information so that the packets 114 can be properly routed to their destinations, which may include computers 116 or other devices communicably coupled to the IP network 110. A network controller 118 is communicably coupled to the PSTN 106 and the switch 108, and provides control signals to the switch 108 for proper processing of the TDM based communications 112. The network controller 118 may also be communicably connected to the IP network 110. Network controller 118 can function as a Media Gateway Control ("MGC"). The MGC protocol is one of a few proposed control and signal standards to compete with the older H.323 standard for the conversion of audio signals carried on telephone circuits, such as PSTN 106 to data packets carried over the Internet or other packet networks, such as IP network 110. As will be appreciated by those skilled in the art, this example is not limited to the conversion of TDM based communications to IP-based communications; instead, the present invention may be applied to any conversion of a multiplexed communication to a packet-based communication.

IP specifies the format of packets, also called datagrams, and the addressing scheme. Most networks combine IP with a higher-level protocol called Transport Control Protocol ("TCP"), which establishes a virtual connection between a destination and a source. IP allows a packaged to be addressed and dropped in a system, but there is no direct link between the sender and the recipient. TCP/IP, on the other hand, establishes a connection between two hosts so that they can send messages back and forth for a period of time. IP network 110 receives and sends messages through switch 108, ultimately to phone 102 and/or fax 104. PCs 116 receive and send messages through IP network 110 in a packet-compatible format. Voice over IP ("VoIP") is the ability to make telephone calls and send faxes over IP-based data networks, such as IP network 110. An integrated voice/data network 100 allows more standardization and reduces total equipment needs. VoIP can support multimedia and multi-service applications.

Figure 2:
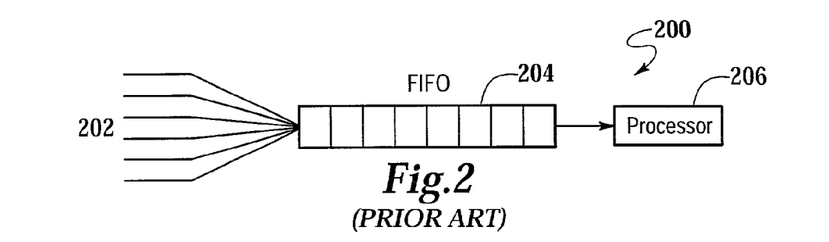
FIG. 2 is a schematic diagram illustrating a message scheduling system in accordance with the prior art.
Figure 3:
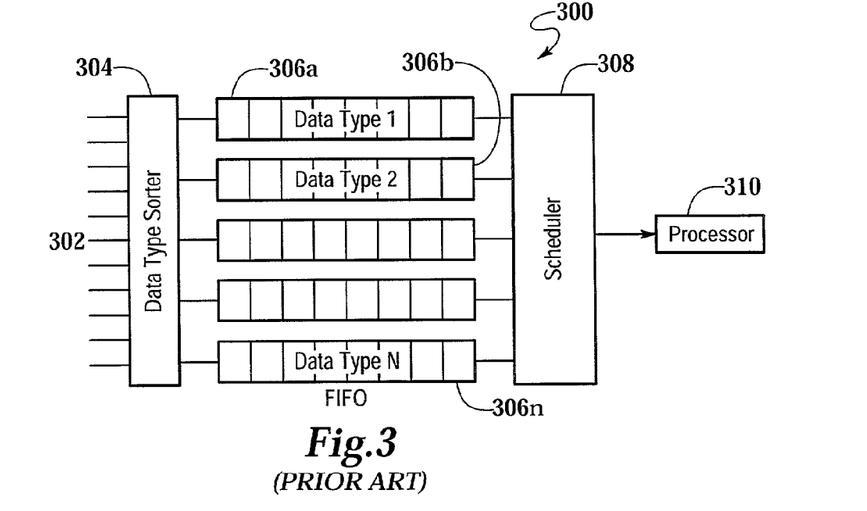
FIG. 3 is a schematic diagram illustrating another message scheduling system in accordance with the prior art.

FIGS. 2 and 3 are schematic diagrams illustrating two message scheduling systems 200 and 300 in accordance with the prior art. In FIG. 2, messages 202 are received and stored in first-in-first-out ("FIFO") queue 204. Messages 202 are then sent to processor 206 in the order in which they were received. No processing prioritization other than arrival time is applied in queue 204 is applied. In FIG. 3, messages 302 enter data type sorter 304 where messages 302 are separated by data type. A FIFO queue 306a, 306b, . . . 306n exists for each individual data type. Data type sorter 304 sends messages 302 to FIFO queues 306a, 306b, . . . 306n based on matching data types. Scheduler 308 then pulls messages 302 from FIFO queues 306a, 306, . . . 306n and sends messages 302 to processor 310. The primary prioritization is again based on arrival time in queues 306a, 306b, . . . 306n. Scheduler 308 only coordinates the pulling of messages 302 for processing.

Figure 4:
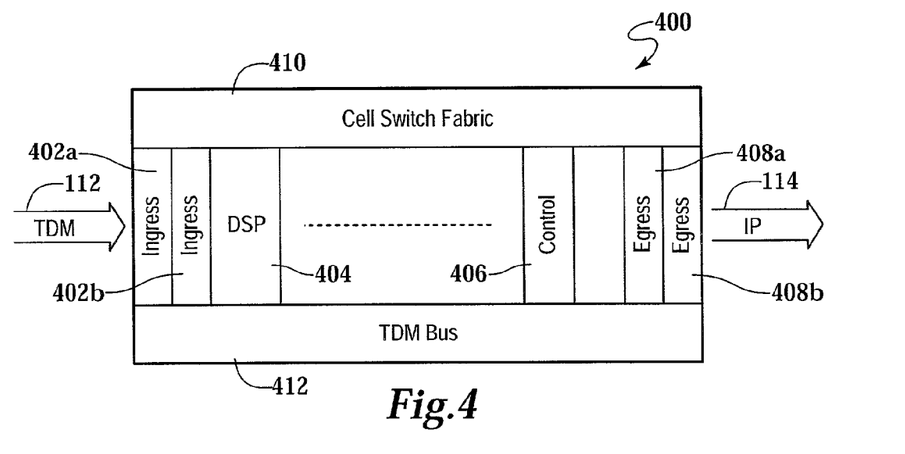
FIG. 4 is a diagram of a packet network switch in accordance with the present invention.

Now referring to the present invention and to FIG. 4, a packet network switch 400 will now be described. The packet network switch 400 can be used to process VoIP, voice over Frame Relay ("VoFR") and other types of calls. Moreover, the packet network switch 400 is similar to an asynchronous transfer mode ("ATM") switch. ATM is a connection-oriented technology used in both local area network ("LAN") and wide area network ("WAN") environments. It is a fast-packet switching technology that allows free allocation of capacity to each channel. Packet network switch 400 includes one or more ingress cards 402a and 402b, one or more signal processing cards 404, one or more control cards 406, one or more egress cards 408a and 408b, a switch fabric 410 and a TDM bus 412. Each signal processing card 404 contains an array of digital signal processors ("DSP") (not shown) and each control card 406 contains one or more processors (not shown). The switch fabric 410 communicably couples the ingress cards 402, the signal processing cards 404, the control cards 406 and the egress cards 408 together. The TDM bus 412 also communicably couples the ingress cards 402, the signal processing cards 404, the control cards 406 and the egress cards 408 together. Preferably cards 402, 404, 406 and 408 can be inserted in any order within packet network switch 400. Moreover, the packet network switch 400 should include sufficient numbers of redundant cards to serve as backup cards in the event a card 402, 404, 406 and 408 fails.

The main function of a packet network switch 400 is to relay user data cells from input ports to the appropriate output ports. When a call or communication is to be handled by the packet network switch 400, a network controller 118 (FIG. 1) provides the control card 408 with the necessary call setup information. Control card 408 uses this call setup information to assign a port in ingress cards 402a or 402b to receive the call from the PSTN 106 (FIG. 1), a DSP within processing card 404 to process the call, and a port in egress cards 408a or 408b to send the call to IP network 110 (FIG. 1). The TDM-based communications or messages 112 enter through ingress cards 402a or 402b and are routed to the appropriate processing card 404 through TDM Bus 412. The DSPs in processing card 404 convert messages between analog and digital information formats, and provide digital compression and switching functions. In one embodiment, each processing card 404 is capable of processing 1024 simultaneous sessions. The processing card 404 then sends the messages from the DSP to cell switch fabric 410, which is primarily responsible for the routing and transferring of messages or data cells, the basic transmission unit, between switch elements. The switch fabric 410 may also provide cell buffering, traffic concentration and multiplexing, redundancy for fault tolerance, multicasting or broadcasting, and cell scheduling based on delay priorities and congestion monitoring. Switch fabric 410 ultimately routes the messages to egress cards 408a or 408b. In one embodiment, each egress card 408 is capable of handling at least 8000 calls. Egress cards 408a and 408b typically send the messages to a gigabit Ethernet (not shown). As its name indicates, the gigabit Ethernet supports data rates of one (1) gigabit (1,000 megabits) per second.

Figure 5:
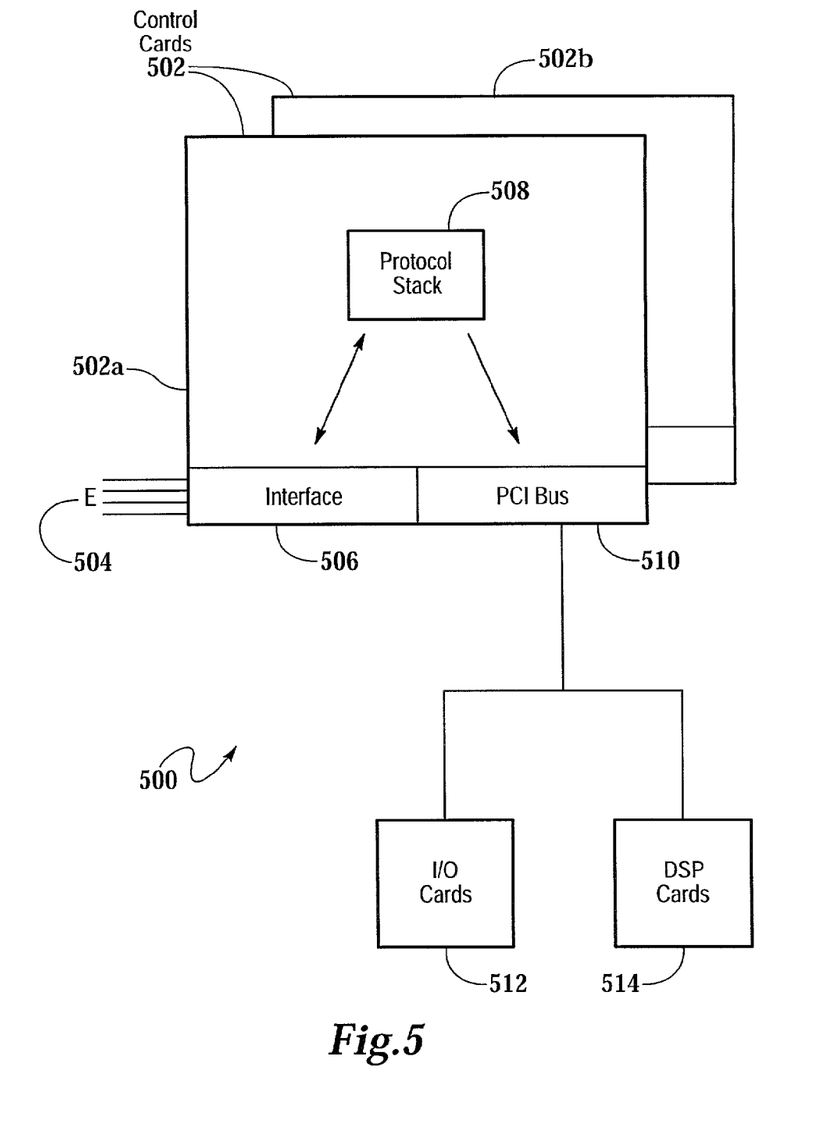
FIG. 5 is a schematic diagram illustrating a packet operating system in accordance with the present invention.

Turning now to FIG. 5, a schematic diagram illustrating a packet operating system 500 with redundant control cards 502a and 502b is shown. Control cards 502a and 502b are housed within a single chassis, such as switch 400 (FIG. 4). Messages 504 enter packet operating system 500 through interface 506 on control card 502a. Messages 504 travel from interface 506 onto protocol stack 508 and then to peripheral component interconnect ("PCI") bus 510. PCI bus 510 sends messages 504 to either input/output ("I/O") cards 512 or DSP cards 514. Control card 502b mirrors either a portion or all of the data of control card 502a. Each control card 502a and 502b of packet operating system 500 has its own memory and thus avoids the typical problems associated with shared memory, such as recursive calls and have synchronization and corruption problems.

Figure 6:
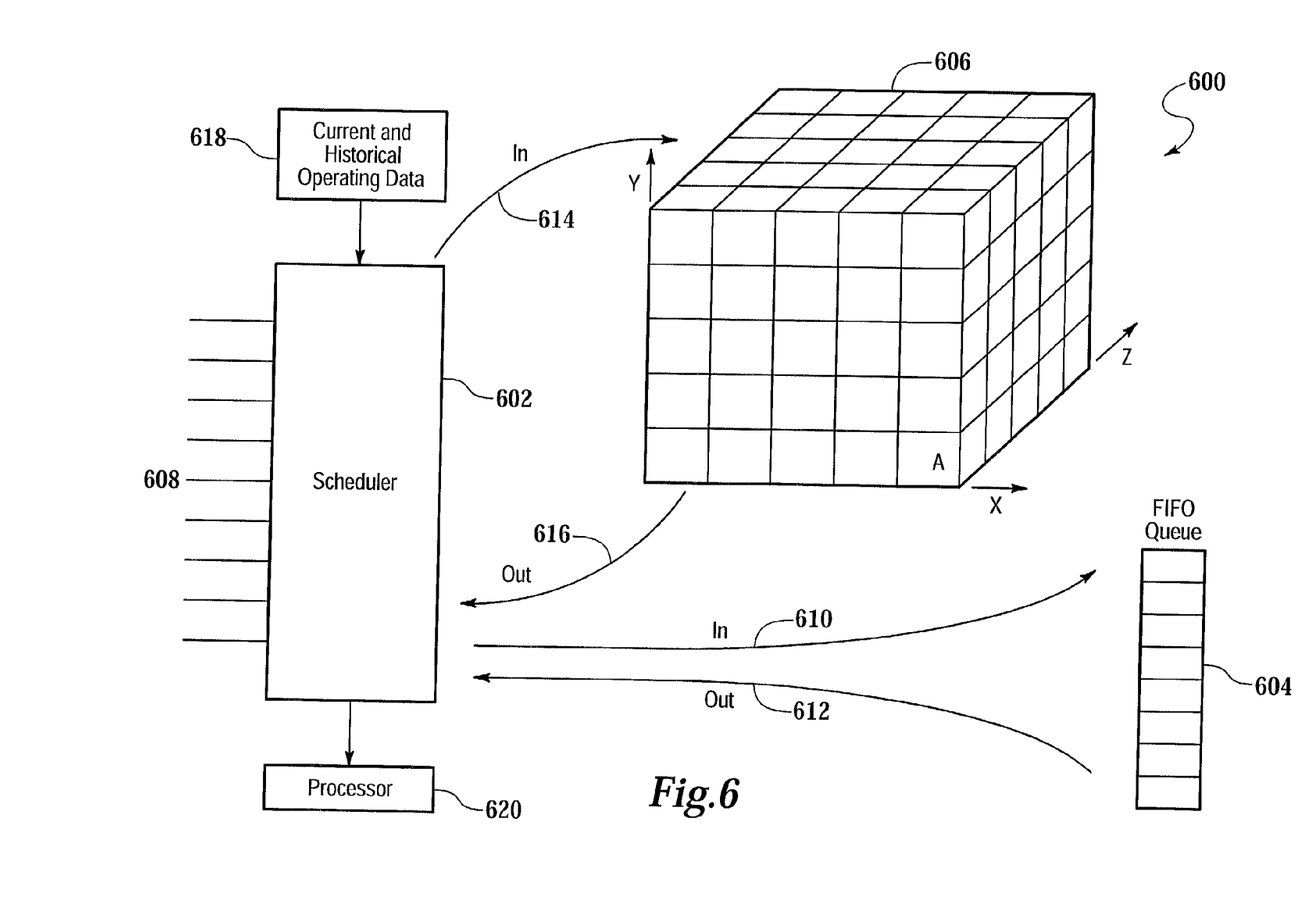
FIG. 6 is a schematic diagram illustrating a message scheduling system in accordance with the present invention.

FIG. 6 is a schematic diagram illustrating a message scheduling system 600 in accordance with the present invention. The scheduling system 600 of the present invention includes a scheduler 602 communicably coupled to a first queue 604 and a second queue 606.

The first queue 604 may be a first-in-first-out ("FIFO") queue. As a result, the scheduler 602 stores messages in the first queue 604 (line 610) in the order they are received. Similarly, the scheduler 602 pulls or schedules queued messages from the first queue 604 (line 612) in the order they were stored in the first queue 604. The second queue 606 may be a multidimensional queue and may be described as a "set" of queues wherein the first square along the X-axis and Y-axis, such as square 606A, represents the head of a queue. Note that the second queue 606 is not limited to a three-dimensional queue as depicted in FIG. 6. Each queue within the second queue 606 is designated to receive messages based on one or more of the attributes of the message. The one or more message attributes may include a message priority, a virtual private network ("VPN") classification, a destination software function, other attributes that distinguish one message from another, or combinations thereof. Message priority can be based on QoS parameters or the type of message, such as data, fax, image, multimedia, voice, etc. VPN classification can be individual VPNs or groups of VPNs. For example, one possible configuration of the second queue 606 could be based on VPN classification in the X-direction, message priority in the Y-direction, and FIFO in the Z-direction.

The scheduler 602 stores messages 608 in the second queue 606 using a scheduling algorithm that is data driven based on one or more attributes of the messages 608 and may favor one attribute over another attribute. For example, the scheduling algorithm may favor higher priority messages. However, the scheduling algorithm will still balance the VPN. Additionally, it is also efficient to process messages 608 based on the processing entity (function); the same type of function will require the same type of processing. A semaphore or counter can drive the tasking.

The scheduler 602 pulls or schedules queued messages from the second queue 606 based on one or more operating criteria 618, such as historical operating data, current operating data, one or more anti-starvation criteria, one or more of the message attributes as described above, or combinations thereof. For example, processor 620 may have spent a large amount of processing on messages 602 with a high priority. Therefore, the scheduling algorithm may drive scheduler 602 to begin selecting messages (line 616) from the second queue 606 that have lower priorities but have a common VPN or processing entity (function). Once the scheduler 602 pulls or schedules a queued message, whether from the first queue 604 or the second queue 606, the scheduler 602 sends the message to the processor 620.

Alternatively, there can be multiple dispatchers with a preemption table such as:

|       |        |             |
|-------|--------|-------------|
| DST 1 | Local  | DispQueue #1 |
| DST 2 | Remote | Node Y      |
| DST 3 | Local  | DispQueue #2 |

The destination entity is looked up in the preemption table or message routing table. If the destination entity is remote, such as DST 2, the message is passed to the messaging system for transport to the appropriate node, such as Node Y, and the local dispatchers are not involved. If, however, the destination was local, such as DST 1 or DST 3, or if the messaging system delivers a received message for an entity which is local, then the message routing table will indicate which local dispatcher's queues should handle the message. The system could be designed so that, for example, messages placed in the queue for DST3, DispQueue #2, would take priority over messages placed in the queue for DST 1, DispQueue #1. As a result, processing on messages done by a lower priority dispatcher will immediately be preempted until the highest priority dispatcher has no messages left to process, at which time processing will resume in the next higher priority dispatcher that has messages left to process.

The scheduler 602 has at least two operating modes. The first operating mode includes receiving messages 608, storing each message in the first queue 604 based on a first-in-first-out order (indicated by arrow 610), and pulling or scheduling each queued message from the first queue 604 based on the first-in-first-out order (indicated by arrow 612). The first operating mode is configured to quickly process messages 608 during low message traffic conditions. The second operating mode includes receiving messages 608, storing each message in the second queue 606 based one or more message attributes (indicated by arrow 614), and pulling or scheduling each queued message from the second queue 606 based on one or more operating criteria (indicated by arrow 616). The second operating mode is configured to efficiently process messages 608 during high message traffic conditions to reduce congestion while maintaining QoS for all message types.

The scheduler 602 operates in the first operating mode during low message traffic conditions, which may be determined in the rate at that messages 608 are being received and processed or more simply by whether or not the number of messages in the first queue 604 exceeds a first predetermined value; then it switches modes. The first predetermined value may be a fixed number of messages or a variable number of messages based on the rate that messages 608 are being received and being processed, or based on other operating parameters. As will be appreciated by those skilled in the art, the present invention can be configured to operate with more than two queues and in numerous other operating modes to accommodate specific processing goals, applications or traffic conditions.

For example, the scheduler 602 of the present invention may include a third and fourth operating mode to serve as transitional operating modes when the scheduler 602 switches from the first operating mode to the second operating mode, and from the second operating mode to the first operating mode. The scheduler 602 may switch to the third operating mode when the number of messages in the first queue 604 equals or exceeds a first predetermined value or some other trigger point. At this point, the scheduler 602 ceases storing messages in the first queue 604 (line 610) and begins storing messages in the second queue 606 (line 614) based on one or more attributes of each message. However, the scheduler 602 continues pulling or scheduling queued messages for processing from the first queue 604 (line 612) until the first queue 604 is empty. Once the first queue 604 is emptied, the scheduler 602 operates in the second operating mode and pulls or schedules queued messages for processing from the second queue 606 (line 616) based on one or more operating criteria. During the fourth operating mode, the scheduler 602 stores messages in the first queue 604 and pulls or schedules queued messages from the second queue 606 based on one or more operating criteria. The scheduler 602 switches to the fourth operating mode when the number of messages in the second queue 606 is equal to or less than a second predetermined value or some other trigger point is reached. The second predetermined value may be a fixed number of messages or a variable number of messages based on the rate that messages 608 are being received and being processed, or based on other operating parameters. The fourth operating mode is maintained until the second queue 606 is emptied. Then the scheduler 602 returns to the first operating mode and pulls or schedules queued messages for processing from the first queue 604 (line 612). The scheduler 602 operating modes can be summarized as follows:

| Operating Modes | Store Messages In | Pull Messages From |
|-----------------|-------------------|--------------------|
| First           | First Queue       | First Queue        |
| Second          | Second Queue      | Second Queue       |
| Third           | Second Queue      | First Queue        |
| Fourth          | First Queue       | Second Queue       |

Figure 7:
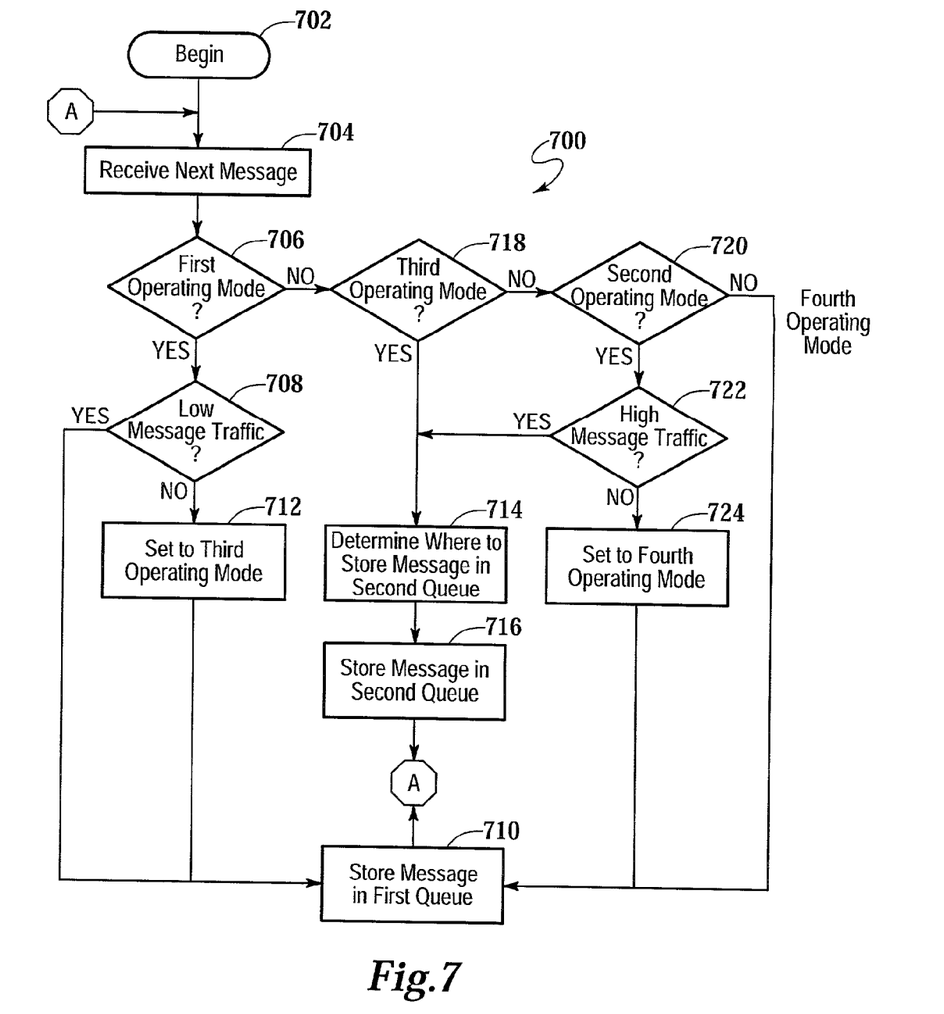
FIG. 7 is a flowchart illustrating a method for storing messages into queues in accordance with one embodiment of the present invention.

Now referring to FIG. 7, a flowchart illustrating a method for storing messages into queues 700 in accordance with one embodiment of the present invention is shown and will also be described in reference to FIG. 6. The method 700 is based on a low message traffic mode (first operating mode), a high message traffic mode (second operating mode) and two transition modes (third and fourth operating modes). The method 700 begins in block 702 where the scheduler 602 is initialized with the desired operating parameters and starts off set to the first operating mode. The scheduler 602 receives the next message 608 in block 704. If the scheduler 602 is operating in the first operating mode, as determined in decision block 706, and under low message traffic conditions, as determined in decision block 708, the scheduler 602 stores the message 608 in the first queue 604 in block 710, which is also indicated by line 610. The scheduler 602 then returns to block 704 to receive the next message 608. If, however, the scheduler 602 is operating in the first operating mode, as determined in decision block 706, and not under low message traffic conditions, as determined in decision block 708, the scheduler 602 is set to the third operating mode in block 712 and determines where to store the message 608 in the second queue 606 based on one or more attributes of the message 608 in block 714. The scheduler 602 then stores the message 608 in the second queue 606 in block 716, which is also indicated by line 614. The scheduler 602 then returns to block 704 to receive the next message 608.

If, however, the scheduler 602 is not operating in the first operating mode, as determined in decision block 706, and is operating in the third operating mode, as determined in decision block 718, the scheduler 602 determines where to store the message 608 in the second queue 606 based on one or more attributes of the message 608 in block 714. The scheduler 602 then stores the message 608 in the second queue 606 in block 716, which is also indicated by line 614. The scheduler 602 then returns to block 704 to receive the next message 608.

If, however, the scheduler 602 is not operating in the third operating mode, as determined in decision block 718, and is operating in the second operating mode, as determined in decision block 720, and is operating in high message traffic conditions, as determined in decision block 722, the scheduler 602 determines where to store the message 608 in the second queue 606 based on one or more attributes of the message 608 in block 714. The scheduler 602 then stores the message 608 in the second queue 606 in block 716, which is also indicated by line 614. The scheduler 602 then returns to block 704 to receive the next message 608. If, however, the scheduler 602 is not operating under high message traffic conditions, as determined in decision block 722, the scheduler 602 is set to the fourth operating mode in block 724. The scheduler 602 then stores the message 608 in the first queue 604 in block 710, which is also indicated by line 610, and returns to block 704 to receive the next message 608. If, however, the scheduler 602 is not operating in the second operating mode, as determined in decision block 720, which means the scheduler 602 is operating in the fourth operating mode, the scheduler 602 stores the message 608 in the first queue 604 in block 710, which is also indicated by line 610, and returns to block 704 to receive the next message 608.

Figure 8:
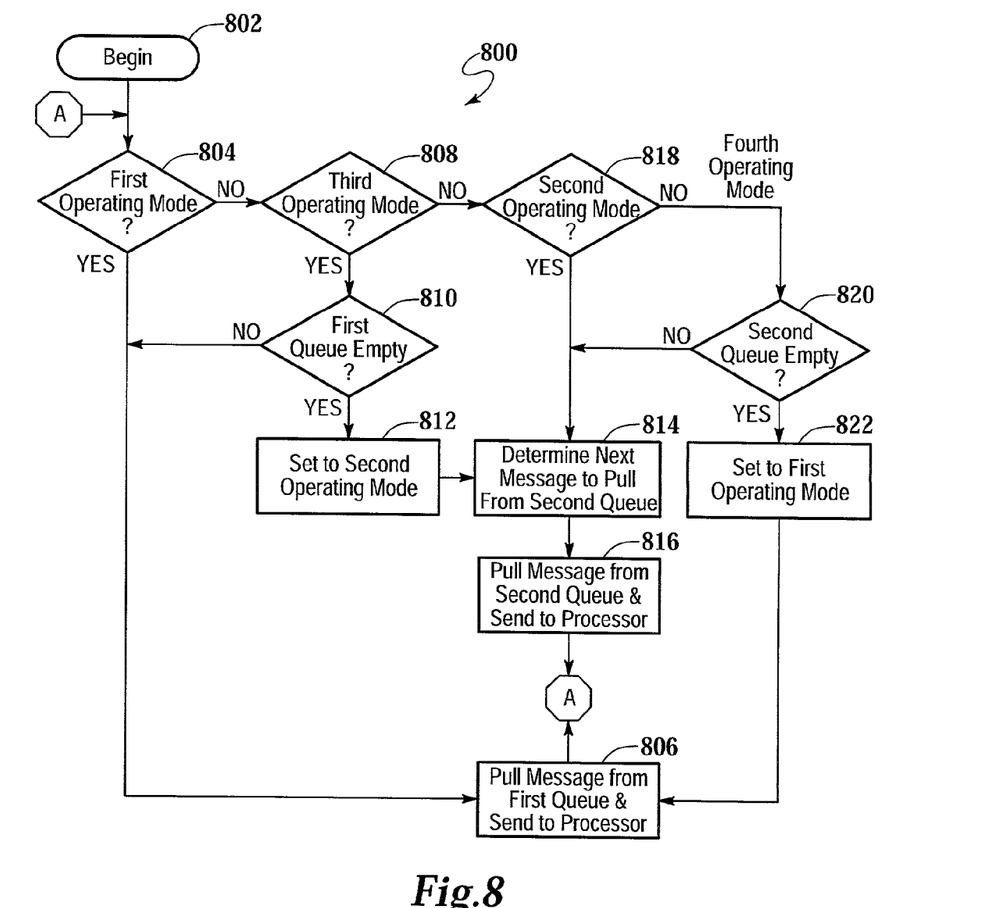
FIG. 8 is a flowchart illustrating a method for scheduling or pulling queued messages from queues for processing in accordance with one embodiment of the present invention.

Referring now to FIG. 8, a flowchart illustrating a method for pulling or scheduling queued messages from queues for processing 800 in accordance with one embodiment of the present invention is shown and will also be described in reference to FIG. 6. The method 800 is based on a low message traffic mode (first operating mode), a high message traffic mode (second operating mode) and two transition modes (third and fourth operating modes). The method 800 begins in block 802 after the scheduler has been initialized with the desired operating parameters and starts off set to the first operating mode (see description associated with block 702 (FIG. 7)). If the scheduler 602 is operating in the first operating mode, as determined in decision block 804, the scheduler 602 pulls or schedules the next queued message from the first queue 604, as shown by line 612, and sends it to the processor 620 in block 806. The scheduler 602 then returns to decision block 804 to pull or schedule the next queued message for processing. If, however, the scheduler 602 is not operating in the first operating mode, as determined in decision block 804, and is operating in the third operating mode, as determined in decision block 808, and the first queue 604 is not empty, as determined in decision block 810, the scheduler 602 pulls or schedules the next queued message from the first queue 604, as shown by line 612, and sends it to the processor 620 in block 806. The scheduler 602 then returns to decision block 804 to pull or schedule the next queued message for processing. If, however, the first queue 604 is empty, as determined in decision block 810, the scheduler 602 is set to the second operating mode in block 812. The scheduler 602 then determines the next queued message to pull or schedule from the second queue 606 based on one or more operating criteria in block 814.

Next, the scheduler 602 pulls or schedules the selected queued message from the second queue 606, as shown by line 616, and sends it to the processor 620 in block 816. The scheduler 602 then returns to decision block 804 to pull or schedule the next queued message for processing.

If, however, the scheduler 602 is not operating in the third operating mode, as determined in decision block 808, and is operating in the second operating mode, as determined in decision block 818, the scheduler 602 determines the next queued message to pull or schedule from the second queue 606 based on one or more operating criteria in block 814. Next, the scheduler 602 pulls or schedules the selected queued message from the second queue 606, as shown by line 616, and sends it to the processor 620 in block 816. The scheduler 602 then returns to decision block 804 to pull or schedule the next queued message for processing. If, however, the scheduler 602 is not operating in the second operating mode, as determined in decision block 818, which means the scheduler 602 is operating in the fourth operating mode, and the second queue 606 is not empty, as determined in decision block 820, the scheduler 602 determines the next queued message to pull or schedule from the second queue 606 based on one or more operating criteria in block 814. Next, the scheduler 602 pulls or schedules the selected queued message from the second queue 606, as shown by line 616, and sends it to the processor 620 in block 816. The scheduler 602 then returns to decision block 804 to pull or schedule the next queued message for processing. If, however, the second queue 606 is empty, as determined in decision block 822, the scheduler 602 is set to the first operating mode in block 822. The scheduler 602 then pulls or schedules the next queued message from the first queue 604, as shown by line 612, and sends it to the processor 620 in block 806. The scheduler 602 then returns to decision block 804 to pull or schedule the next queued message for processing.

Although preferred embodiments of the present invention have been described in detail, it will be understood by those skilled in the art that various modifications can be made therein without departing from the spirit and scope of the invention as set forth in the appended claims.

What is claimed is:

1. An apparatus for scheduling one or more messages comprising:
    a first queue;
    a second queue;
    a scheduler communicably coupled to the first queue and the second queue, the scheduler having at least a first and second operating mode;
    the first operating mode comprising receiving the one or more messages, storing each message in the first queue based on a first-in-first-out order, and scheduling each queued message from the first queue based on the first-in-first-out order and wherein said first operating mode corresponds to low message traffic conditions; and the second operating mode comprising receiving the one or more messages, storing each message in the second queue based on one or more message attributes, and scheduling each queued message from the second queue based on one or more operating criteria wherein said one or more operating criteria is based on current operating data.

2. The apparatus as recited in claim 1, wherein the scheduler operates in the first mode when the number of queued messages in the first queue is less than a first value and the number of queued messages in the second queue is zero.

3. The apparatus as recited in claim 1, wherein the second operating mode corresponds to high message traffic conditions.

4. The apparatus as recited in claim 1, wherein the scheduler operates in the second mode when the number of queued messages in the second queue is greater than a second value and the number of queued messages in the first queue is zero.

5. The apparatus as recited in claim 1, further comprising a third operating mode comprising receiving the one or more messages, storing each message in the second queue based one or more message attributes, and scheduling each queued message from the first queue based on the first-in-first-out order.

6. The apparatus as recited in claim 5, wherein the third operating mode corresponds to a transition from low traffic to high traffic.

7. The apparatus as recited in claim 5, wherein the scheduler switches to the third operating mode when the number of queued messages in the first queue is greater than or equal to the first value and continues to operate in the third operating mode until the scheduler switches to the second operating mode when the number of queued messages in the first queue is zero.

8. The apparatus as recited in claim 5, further comprising a fourth operating mode comprising receiving the one or more messages, storing each message in the first queue based on the first-in-first-out order, and scheduling each queued message from the second queue based on one or more operating criteria.

9. The apparatus as recited in claim 8, wherein the fourth operating mode corresponds to a transition from high traffic to low traffic.

10. The apparatus as recited in claim 8, wherein the scheduler switches to the fourth operating mode when the number of queued messages in the second queue is less than or equal to the second value and continues to operate in the fourth operating mode until the scheduler switches to the first operating mode when the number of queued messages in the second queue is zero.

11. The apparatus as recited in claim 1, wherein the second queue is a multi-dimensional queue.

12. The apparatus as recited in claim 1, wherein the one or more message attributes includes a message priority.

13. The apparatus as recited in claim 1, wherein the one or more message attributes includes a virtual private network classification.

14. The apparatus as recited in claim 1, wherein the one or more message attributes includes a destination software function.

15. The apparatus as recited in claim 1, wherein the one or more operating criteria is further based on historical operating data.

16. The apparatus as recited in claim 1, wherein the one or more operating criteria is based on one or more anti-starvation criteria.

17. The apparatus as recited in claim 1, further comprising a processor communicably coupled to the scheduler for processing the dispatched messages.

18. The apparatus as recited in claim 1, further comprising a memory communicably coupled to the scheduler for storing the one or more operating criteria.

19. A method for scheduling one or more messages comprising the steps of:
receiving the one or more messages;
selecting a first queue for input and output during a first operating mode wherein said first operating mode corresponds to low message traffic conditions;
selecting a second queue for input and output during a second operating mode;
storing each message in the first queue based on a first-in-first-out order whenever the first queue is selected for input or storing each message in the second queue based on one or more message attributes whenever the second queue is selected for input; and
scheduling each queued message from the first queue based on the first-in-first-out order whenever the first queue is selected for output or scheduling each queued message from the second queue based one or more operating criteria whenever the second queue is selected for output wherein said one or more operating criteria is based on current operating data.

20. The method as recited in claim 19, wherein the first operating mode occurs when the number of queued messages in the first queue is less than a first value and the number of queued messages in the second queue is zero.

21. The method as recited in claim 19, wherein the second operating mode corresponds to high message traffic conditions.

22. The method as recited in claim 19, wherein the second operating mode occurs when the number of queued messages in the second queue is greater than a second value and the number of queued messages in the first queue is zero.

23. The method as recited in claim 19, further comprising the step of selecting the second queue for input and the first queue for output during a third operating mode.

24. The method as recited in claim 23, wherein the third operating mode corresponds to a transition from low traffic to high traffic.

25. The method as recited in claim 23, wherein the third operating mode occurs when the number of queued messages in the first queue is greater than or equal to the first value and continues until switching to the second operating mode when the number of queued messages in the first queue is zero.

26. The method as recited in claim 23, further comprising the step of selecting the second queue for output and the first queue for input during a fourth operating mode.

27. The method as recited in claim 26, wherein the fourth operating mode corresponds to a transition from high traffic to low traffic.

28. The method as recited in claim 26, wherein the fourth operating mode occurs when the number of queued messages in the second queue is less than or equal to the second value and continues until switching to the first operating mode when the number of queued messages in the second queue is zero.

29. The method as recited in claim 19, wherein the second queue is a multi-dimensional queue.

30. The method as recited in claim 19 wherein the one or more message attributes includes a message priority.

31. The method as recited in claim 19, wherein the one or more message attributes includes a virtual private network classification.

32. The method as recited in claim 19, wherein the one or more message attributes includes a destination software function.

33. The method as recited in claim 19, wherein the one or more operating criteria is further based on historical operating data.

34. The method as recited in claim 19, wherein the one or more operating criteria is based on one or more anti-starvation criteria.

35. A computer program embodied on a computer readable medium for scheduling one or more messages, the computer program comprising:
   a code segment for receiving the one or more messages;
   a code segment for selecting a first queue for input and output during a first operating mode and wherein the first operating mode corresponds to low message traffic conditions;
   a code segment for selecting a second queue for input and output during a second operating mode;
   a code segment for storing each message in the first queue based on a first-in-first-out order whenever the first queue is selected for input or storing each message in the second queue based on one or more message attributes whenever the second queue is selected for input; and
   a code segment for scheduling each queued message from the first queue based on the first-in-first-out order whenever the first queue is selected for output or scheduling each queued message from the second queue based one or more operating criteria whenever the second queue is selected for output wherein said one or more operating criteria is based on current operating data.

36. The computer program as recited in claim 35, wherein the first operating mode occurs when the number of queued messages in the first queue is less than a first value and the number of queued messages in the second queue is zero.

37. The computer program as recited in claim 35, wherein the second operating mode corresponds to high message traffic conditions.

38. The computer program as recited in claim 35, wherein the second operating mode occurs when the number of queued messages in the second queue is greater than a second value and the number of queued messages in the first queue is zero.

39. The computer program as recited in claim 35, further comprising a code segment for selecting the second queue for input and the first queue for output during a third operating mode.

40. The computer program as recited in claim 39, wherein the third operating mode corresponds to a transition from low traffic to high traffic.

41. The computer program as recited in claim 39, wherein the third operating mode occurs when the number of queued messages in the first queue is greater than or equal to the first value and continues until switching to the second operating mode when the number of queued messages in the first queue is zero.

42. The computer program as recited in claim 39, further comprising a code segment for selecting the second queue for output and the first queue for input during a fourth operating mode.

43. The computer program as recited in claim 42, wherein the fourth operating mode corresponds to a transition from high traffic to low traffic.

44. The computer program as recited in claim 42, wherein the fourth operating mode occurs when the number of queued messages in the second queue is less than or equal to the second value and continues until switching to the first operating mode when the number of queued messages in the second queue is zero.

45. The computer program as recited in claim 35, wherein the second queue is a multi-dimensional queue.

46. The computer program as recited in claim 35, wherein the one or more message attributes includes a message priority.

47. The computer program as recited in claim 35, wherein the one or more message attributes includes a virtual private network classification.

48. The computer program as recited in claim 35, wherein the one or more message attributes includes a destination software function.

49. The computer program as recited in claim 35, wherein the one or more operating criteria is further based on historical operating data.

50. The computer program as recited in claim 35, wherein the one or more operating criteria is based on one or more anti-starvation criteria.

51. A communications switch comprising:
   one or more ingress cards;
   one or more signal processing cards, each signal processing card containing an array of digital signal processors;
   one or more control cards containing one or more processors;
   one or more egress cards;
   a switch fabric communicably coupling the ingress cards, the signal processing cards, the control cards and the egress cards;
   a TDM bus communicably coupling the ingress cards, the signal processing cards, the control cards and the egress cards;
   a scheduler communicably coupled to each processor, the scheduler having at least a first and second operating mode;
   a first queue communicably coupled to the scheduler
   a second queue communicably coupled to the scheduler;
   the first operating mode comprising receiving the one or more messages storing each message in the first queue based on a first-in-first-out order, and scheduling each queued message from the first queue based on the first-in-first-out order; and
   the second operating mode comprising receiving the one or more messages, storing each message in the second queue based one or more message attributes, and scheduling each queued message from the second queue based one or more operating criteria.

* * * * *